United States Patent
Graf et al.

(10) Patent No.: US 8,140,531 B2
(45) Date of Patent: Mar. 20, 2012

(54) PROCESS AND METHOD FOR CLASSIFYING STRUCTURED DATA

(75) Inventors: Marcel Graf, Kilchberg (CH); Morton G. Swimmer, Pleasantville, NY (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/114,296

(22) Filed: May 2, 2008

(65) Prior Publication Data

US 2009/0276446 A1 Nov. 5, 2009

(51) Int. Cl.
*G06F 7/00* (2006.01)
(52) U.S. Cl. ............................................... 707/737
(58) Field of Classification Search .................. None
See application file for complete search history.

(56) References Cited

U.S. PATENT DOCUMENTS

| | | | |
|---|---|---|---|
| 5,159,667 A | 10/1992 | Borrey et al. | |
| 5,845,068 A * | 12/1998 | Winiger | 726/3 |
| 6,701,314 B1 * | 3/2004 | Conover et al. | 707/740 |
| 6,804,684 B2 * | 10/2004 | Stubler et al. | 1/1 |
| 6,826,576 B2 * | 11/2004 | Lulich et al. | 707/740 |
| 6,925,154 B2 * | 8/2005 | Gao et al. | 379/88.03 |
| 6,947,947 B2 * | 9/2005 | Block et al. | 1/1 |
| 7,865,358 B2 * | 1/2011 | Green et al. | 704/10 |
| 7,899,832 B2 * | 3/2011 | Abhyankar et al. | 707/752 |
| 7,921,367 B2 * | 4/2011 | Rivas et al. | 715/746 |
| 2002/0007373 A1 | 1/2002 | Blair et al. | |
| 2003/0084142 A1* | 5/2003 | Casati et al. | 709/224 |
| 2003/0177000 A1 | 9/2003 | Mao et al. | |
| 2003/0182583 A1* | 9/2003 | Turco | 713/201 |
| 2005/0071362 A1* | 3/2005 | Nelson et al. | 707/102 |
| 2005/0080781 A1* | 4/2005 | Ryan et al. | 707/5 |
| 2005/0203931 A1* | 9/2005 | Pingree et al. | 707/100 |
| 2005/0262194 A1 | 11/2005 | Mamou et al. | |
| 2005/0288920 A1* | 12/2005 | Green et al. | 704/3 |
| 2005/0289168 A1 | 12/2005 | Green et al. | |
| 2006/0026157 A1 | 2/2006 | Gupta et al. | |
| 2006/0112110 A1* | 5/2006 | Maymir-Ducharme et al. | 707/100 |
| 2006/0150087 A1* | 7/2006 | Cronenberger et al. | 715/513 |
| 2007/0028171 A1* | 2/2007 | MacLaurin | 715/705 |
| 2007/0112838 A1* | 5/2007 | Bjarnestam et al. | 707/102 |
| 2007/0130182 A1* | 6/2007 | Forney | 707/101 |
| 2007/0143327 A1* | 6/2007 | Rivas et al. | 707/101 |
| 2007/0156665 A1* | 7/2007 | Wnek | 707/4 |
| 2008/0104060 A1* | 5/2008 | Abhyankar et al. | 707/5 |

FOREIGN PATENT DOCUMENTS

EP  1 154 358  11/2001

* cited by examiner

*Primary Examiner* — Robert Timblin
*Assistant Examiner* — Richard Bowen
(74) *Attorney, Agent, or Firm* — Anna Linne; Roberts Mlotkowski Safran & Cole, P.C.

(57) ABSTRACT

A system and method for classifying structured data by automatically suggesting classification labels. The system comprises a taxonomy configured to provide one or more normalized labels and a classification tool configured to automatically classify data across an enterprise system using the one or more normalized labels. The method comprises extracting metadata from one or more relational databases; suggesting classifications based on the metadata; and converting one or more names to normalized labels across an enterprise system based on the suggested classifications.

22 Claims, 5 Drawing Sheets

| Policy/ Rule Name | Effect | Subject | Action | Resource | provided that |
|---|---|---|---|---|---|
| *Rule outline of policy: Global customer information policy* | Permit or deny that | these persons (individual persons or roles) | can | these resources (individual resources or labels) | |
| Name | | any Subject | any Action | Person>Customer | |
| Default: Deny all access | Deny | | | | |
| Allow access to contact information | Permit | Marketing and Sales>Sales | read | Person>Customer>Contact | |
| ↑ | ↑ | ↑ | ↑ | ↑ | |
| 310 | 320 | 330 | 340 | 350 | |

FIG. 3

PROCESS AND METHOD FOR CLASSIFYING STRUCTURED DATA

FIELD OF THE INVENTION

The invention generally relates to a system and method for classifying structured data and, more particularly, to automatically suggesting labels to classify structured data.

BACKGROUND

Data duplication and proliferation within enterprises is a problem. Typically, enterprises manage data with a heterogeneous infrastructure of different data management systems (e.g., Relational Database Management Systems, Document/Content Management Systems, file servers, Network-Attached Storage, etc.). These systems often require data to be replicated and stored as several copies because different applications require data to conform to different schemas. Schemas are used by databases to describe the structure of the data in the database. Schemas can contain, e.g., tables, which contain columns that have names. Additionally, data duplication may be used to improve performance and reliability within a system. However, all of this data duplication contributes to a proliferation of data over time. Therefore, it has become increasingly difficult to provide a business-level overview of the data present in information technology (IT) infrastructures.

Currently enterprises are not able to clearly determine what data assets exist and how the data is relevant to the business. This is in large part because data duplication across an enterprise may result in data acquiring different names depending upon the application that uses the data and/or when the application requires a particular schema, and therefore particular names. Consequently, it is difficult to reconcile data across an enterprise and provide a consolidated view of data assets.

Data classification may be used to categorize stored data within an enterprise. Data classification has traditionally been performed by individuals, which makes it a very time-consuming, error-prone, and an expensive process. Furthermore, with enterprises having many, possibly hundreds, of databases, this task becomes impossible for individuals to carry out. Therefore, data labeling and classification is becoming increasingly important as enterprises attempt to understand the data they have, and comply with internal procedures as well as legislative requirements for protecting data.

The need to classify data continues to grow as reports of data losses are circulated throughout enterprises and communities. Additionally, the need to protect certain data classifications containing private information also increases as more unauthorized persons break through external firewalls and encounter little to no internal security measures. This is particularly relevant as businesses increase business process outsourcing and "offshore" storage of data, which requires that detailed audit trails be kept.

Accordingly, there exists a need in the art to overcome the deficiencies and limitations described hereinabove.

SUMMARY

In a first aspect of the invention, a system comprises a taxonomy configured to provide one or more normalized labels and a classification tool configured to automatically classify data across an enterprise system using the one or more normalized labels.

In another aspect of the invention, the method comprises extracting metadata from one or more relational databases; suggesting classifications based on the metadata; and converting one or more names to normalized labels across an enterprise system based on the suggested classifications.

In another aspect of the invention, a computer program product comprises a computer usable medium having readable program code embodied in the medium. The computer program product includes at least one component to: define one or more normalized labels and associate the one or more normalized labels to data across an enterprise system.

In another aspect of the invention, a system comprises method for classifying data, comprising a computer infrastructure being operable to: classify data across an enterprise system by assigning one or more normalized labels to the data.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 3 illustrates an embodiment for defining one or more policies in accordance with the invention;

DETAILED DESCRIPTION

The invention is directed to a system and method for classifying structured data by automatically suggesting classification labels. More specifically, the invention relates to a taxonomy system and a classification system. The taxonomy system defines a taxonomy by grouping together related concepts and arranging the concepts in a hierarchy. The concepts can include sub-concepts, which are specializations of the concept. These concepts can be represented within the taxonomy in a number of ways, e.g., by a normalized label. One or more normalized data labels may be used to describe a data asset. Additionally, each data asset and/or normalized label may have a policy associated with it. The policy may be a security policy, e.g., a policy stating who can perform which actions on the data, or a data management policy, e.g., a policy stating how often the data needs to be backed up.

Once a taxonomy has been created, a classification system automatically suggests and assigns normalized labels from within a taxonomy to a data asset. The classification system does this through a number of processes including: lexical name matching; lineage analysis; content analysis; and/or data access log mining. Additionally, the classification system may include a human verification process to verify whether a suggested label should be applied to the data. By using this invention, it is now possible to automatically normalize labeling of structured data across an enterprise.

The assignment of normalized labels to data throughout an enterprise allows for a better business overview of the data, and also permits one or more policies to be assigned systematically to data throughout the enterprise by associating a policy to one or more normalized labels. For example, once data is assigned normalized labels, then a policy can be assigned to the normalized labels and applied to all instances of the normalized label. Therefore, in one example, a policy can be assigned to a social security number (SSN) label and applied to all instances throughout the enterprise that use the SSN label without having to individually assign the policy to each instance of the label.

System Environment

Figure 1:
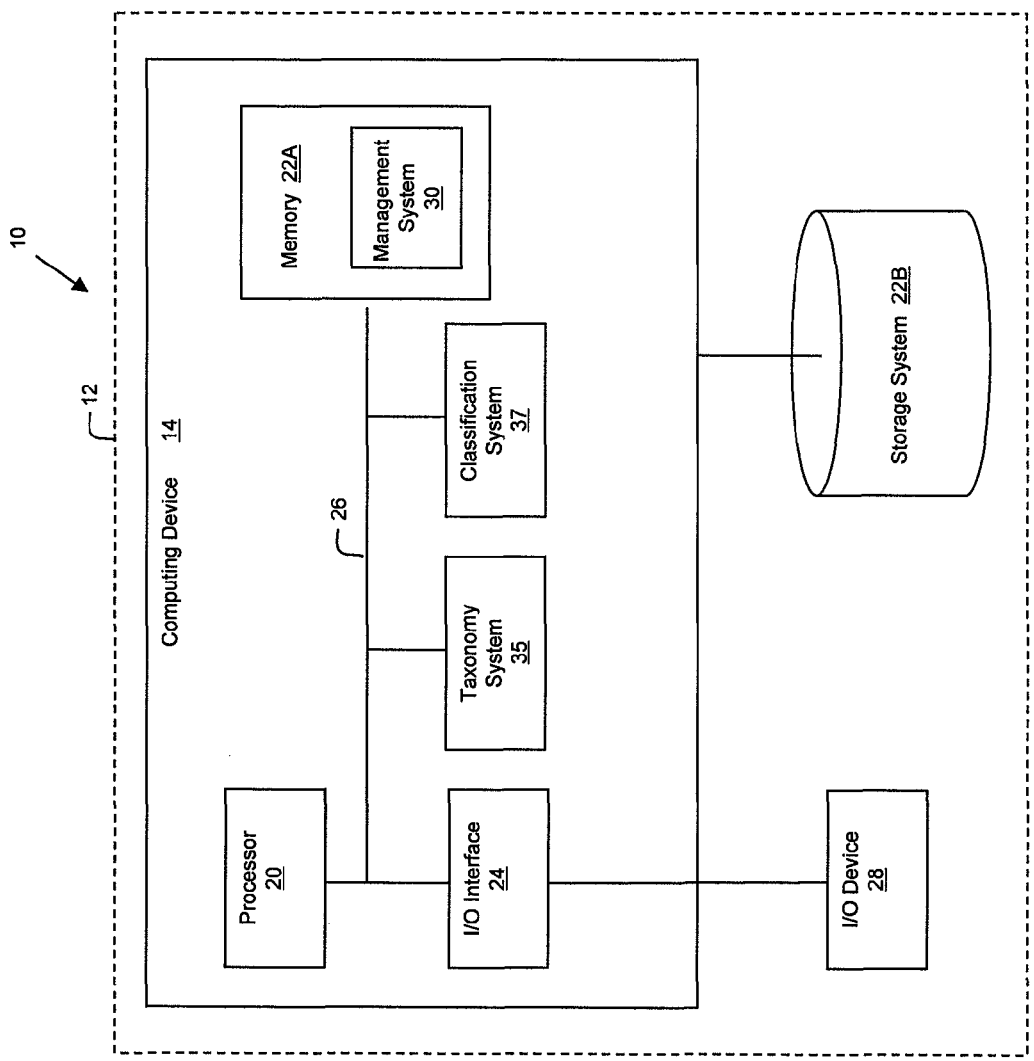
FIG. 1 shows an illustrative environment for implementing the steps in accordance with the invention.

FIG. 1 shows an illustrative environment 10 for managing the processes in accordance with the invention. To this extent, the environment 10 includes a server 12 that can perform the processes described herein. In particular, the server 12 includes a computing device 14 that comprises a management system 30, which makes computing device 14 operable to define one or more taxonomies via a taxonomy system 35 and classify data via a classification system 37.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process as described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Data Classification Overview

Figure 2:
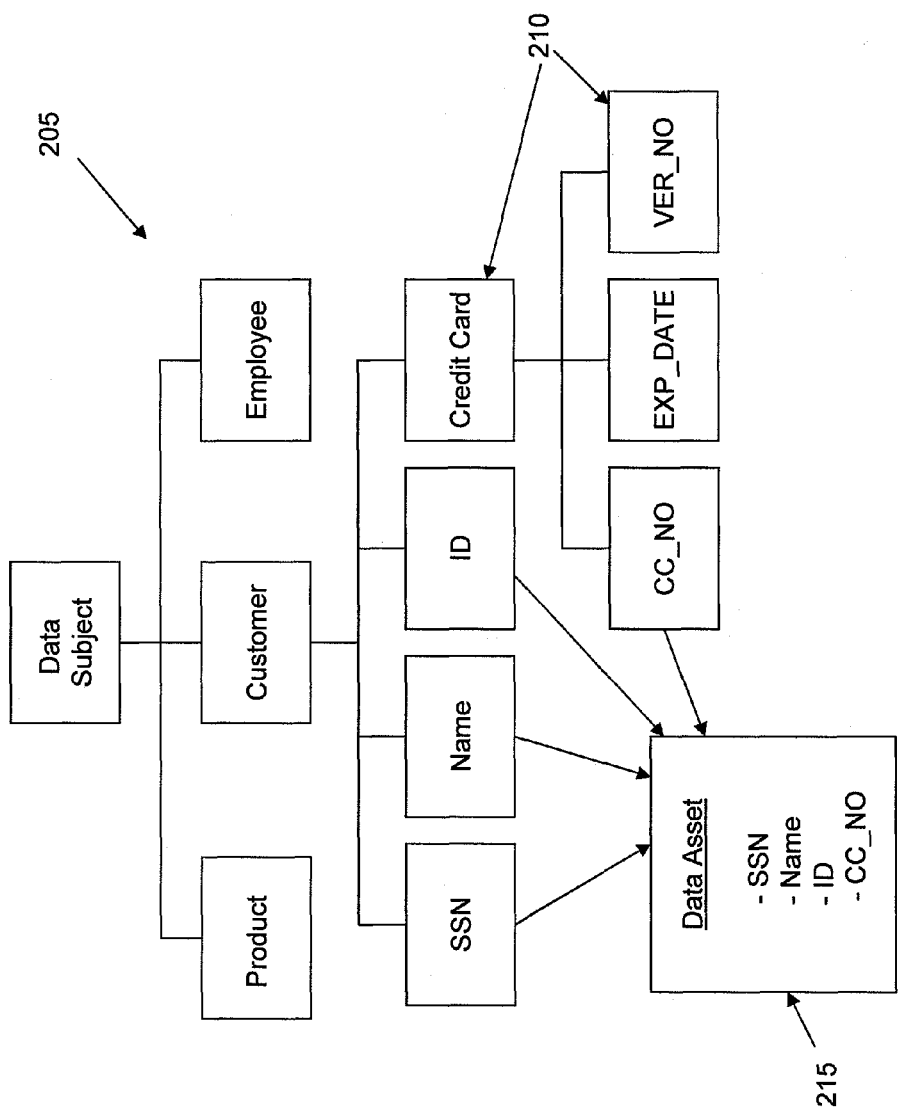
FIG. 2 shows an embodiment for classifying data in accordance with the invention.

FIG. 2 shows an embodiment for classifying data in accordance with an aspect of the invention. Data classification is a technique for creating a business-level overview of data assets 215. Data classification assigns one or more normalized labels 210 to a data asset 215. These normalized labels 210 are business terms that are organized in a controlled vocabulary and are organized in one or more hierarchies. A hierarchy of terms is a taxonomy 205. Each taxonomy 205 reflects one dimension that is relevant to the business. For example, a taxonomy 205 could be used to describe who owns a data asset 215. Other taxonomies 205 could be used to describe the geographic location of a data asset 215 or describe the origin of data. The normalized labels 210 used to classify data can be applied at different levels of granularity. Therefore, embodiments may apply a normalized label 210 to an entire database, an individual table in a database, a column in a table, etc.

The benefit of classifying data is that it is possible to obtain an overview of data assets 215 by ordering them along a particular taxonomy 205, or by combining normalized labels 210 of several taxonomies 205 and identifying the data assets 215 that carry all of the combined normalized labels. Since this overview is across applications, servers, and/or data management technologies, enterprise-wide data management can be used for data lifecycle management and/or security management at a business level.

Implementation

The taxonomy and data classification systems can be implemented in many different ways. Embodiments may use an information server tool, such as IBM® Information Server Tool, which includes a Business Glossary component, to support data classification and allow data analysts to define and/or edit normalized labels organized in one or more taxonomies. (IBM is a registered trademark of International Business Machines Corporation, in the U.S. and throughout the world.) Business Glossary may also be used to store normalized labels and/or taxonomies in a metadata repository.

Embodiments using information server tools can be used to enable data analysts to apply normalized labels from taxonomies to data assets. This may be performed by first telling the information server tool how to connect to the management system that holds the data (e.g., the parameters of an Open Database Connectivity (ODBC) or Java® Database Connectivity (JDBC) connection to a Relational Database Management System). (Java is a registered trademark of Sun Microsystems Incorporated, in the U.S. and throughout the world.)

After connecting to the management system, an information server tool can be used to extract metadata, which can include the structure of the data (e.g., the relational schema that defines the tables and columns.) The extracted metadata can be gathered and stored in a metadata repository such as the storage system 22B of FIG. 1. Once stored, the data may be presented to a data analyst via a graphical user interface (GUI) (e.g., external device 28 of FIG. 1). At this phase, the data is organized according to the structure extracted by the information server tool. A data analyst may apply normalized labels from the taxonomies to the data at different levels of granularity and store the label assignments in the metadata repository.

FIG. 3 illustrates an embodiment where policies are defined and assigned to data assets and/or normalized labels according to one aspect of the invention. Policies can be, for example, security policies. Security policies can be, for example, access control policies. Access control policies can be defined, for example, by designating: a policy name, at column 310; a subject that wants to perform an action on a data asset, at column 330; the action to be performed, at column 340; a resource, which is a list of normalized labels or data assets, at column 350; and an effect, which either permits or denies the action, at column 320. The policies may be named using any number of naming conventions ranging from a descriptive name to an arbitrary number or alphanumeric.

The access control policies are used to protect the data as follows. Whenever a user wants to access a data asset (by performing an action on the data asset, such as create, read, update, delete) the access request is first checked to determine whether it conforms with the access control policies. If it conforms then access is permitted. If it does not conform then access is denied.

A policy decision point can check the access request as follows. The policy decision point can be given the access request, which contains the identity of the user, the intended action, and the location of the data asset to be accessed. The policy decision point can then search the access control policies for all policies that apply to that particular request. The effect parameters of the applying policies then determine whether the access is permitted or denied. Access is permitted if all effect parameters are 'permit'. Access is denied if all effect parameters are 'deny'. If some effect parameters are 'permit' and some are 'deny', the decision is determined with a special rule. If no policy applies at all, another special rule is used.

A policy applies to a request if the policy's parameters match the parameters of the request, i.e., the subject, the action, and the resource match the corresponding parameters of the access request. When determining whether the resource part of a policy matches the request, the match can be direct, if one of the listed data assets matches the requested data asset, or indirect, via labels. To determine if the labels match, the labels of the requested data assets are looked up and compared with the labels in the policy. A match occurs if the requested data asset has all of the labels given in the policy.

Classification System

Figure 4:
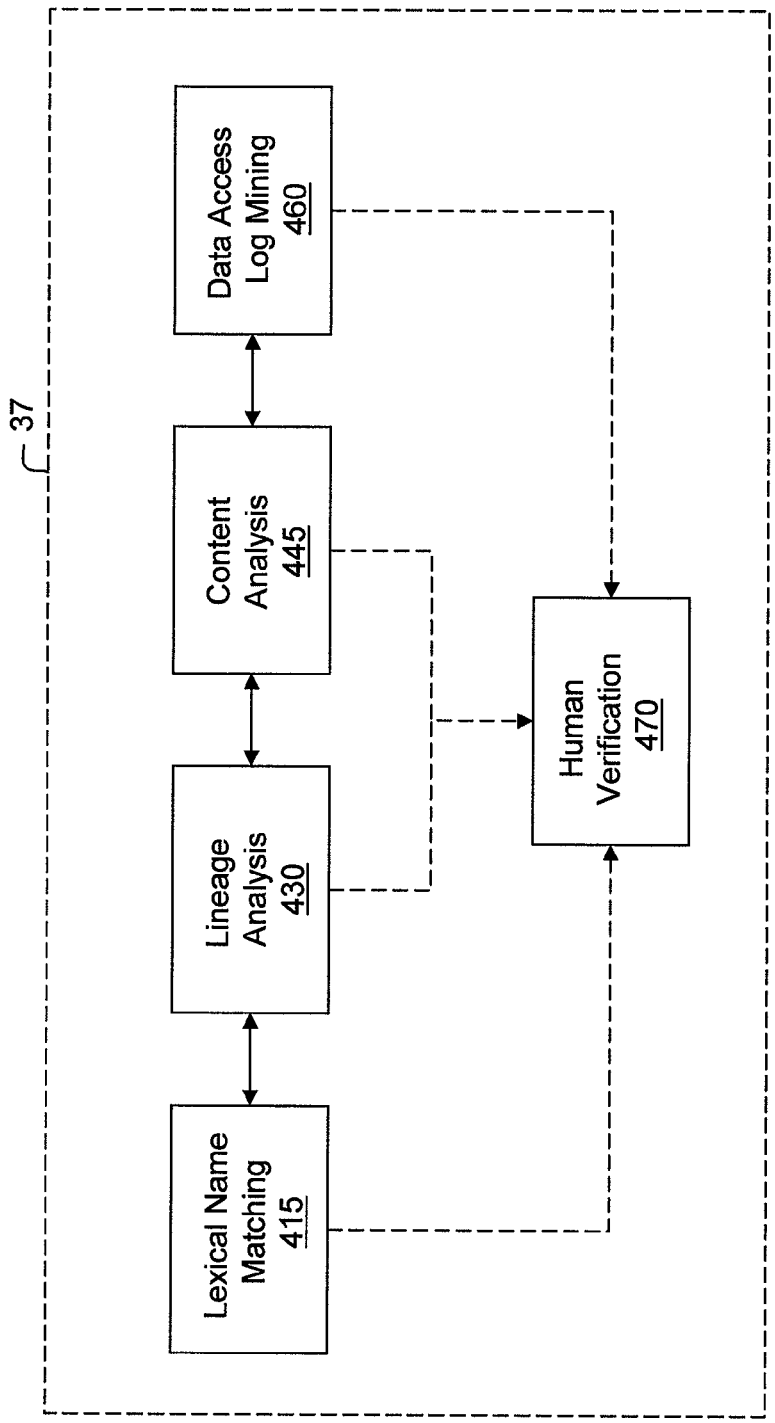
FIG. 4 shows a classification system comprising multiple processes in accordance with the invention.

FIG. 4 illustrates the classification system 37 in accordance with an aspect of the invention. FIG. 4 may also represent a high level flow diagram implementing processes in accordance with the invention. The classification system 37 is configured to automate relational data discovery, perform algorithmically-controlled mappings of existing database schemas, and pre-label corresponding data assets with a corresponding term. Using this classification system 37 results in a normalized labeling of relational data across an enterprise.

The classification system 37 is comprised of the following processes and/or components: a lexical name matching process and/or component 415; a lineage analysis process and/or component 430; a content analysis process and/or component 445; and a data access log mining process and/or component 460. The classification process may also comprise a human verification process and/or component 470 that is employed when a data classification is not certain. For sake of discussion, numerals 415, 430, 445, 460, and 470 will be discussed as processes; although it should be recognized that these referenced numerals can equally represent components implementing the processes using the environment of FIG. 1.

Lexical Name Matching Process

The lexical name matching process 415 is configured to automatically suggest one or more labels for an item. More specifically, the lexical name matching process 415 scans data items and determines what name is assigned to the data item. For example, when finding a table the lexical name matching process 415 looks at the table name and when finding a column it looks at the column name. This may be done by analyzing metadata or other methods known to those skilled in the art. The lexical name matching process 415 then compares the name to normalized labels within the defined taxonomies and then goes through all of the labels in all of the taxonomies. If a label appears in the name then the label is added to the list of suggested labels for the item. The lexical name matching process 415 can then continue to scan other items.

If the scanned name does not include a label that is already in a taxonomy, then the lexical name matching process 415 compares the name to lists of synonyms. Embodiments can allow each label in a taxonomy to have a list of synonyms. The lexical name matching process 415 can go through all of the synonyms associated with each of the labels in every taxonomies. If a synonym appears in the name then the corresponding label is added to the list of suggested labels for this item.

For example, the lexical name matching process 415 can scan data and determine the name used to describe the data is "Name_First". Upon comparing the name "Name_First" to the labels within a taxonomy, the lexical name matching process 415 can determine that the name "Name_First" does not contain any labels. Therefore, the lexical name matching process 415 would compare the "Name_First" name to lists of synonyms that may be used instead of the normalized labels. The list for the label "First Name" may contain, for example: "FN", "F_Name", "Name_F", "Name_First", "FirstName", "First_N", "GivenName", etc. If the lexical name matching process 415 finds the synonym "Name_First" within the list, then the lexical name matching process 415 can determine that the label "First Name" is a good candidate for labeling the data item with the name "Name_First", and automatically add the label to the list of suggested labels. A data item can have as many labels as necessary to describe it fully.

However, if the name does not contain any synonym, then the lexical name matching process can not make any label suggestions and it is left to a human verification process 470 to have a user determine what normalized label should be given to the data. Embodiments may also allow the name to be added to a list of synonyms, either automatically or manually by a user, so that future instances of the name will automatically be mapped to suggested labels.

Lineage Analysis Process

Other categorization processes may be used in addition to or instead of the lexical name matching process 415. For example, a lineage analysis process 430 as contemplated by the invention. A lineage analysis process 430 looks at data movement operations (i.e., where data has come from) to determine if data in one or more locations is the same. If the data is determined to be the same, only in different locations, then the lineage analysis process 430 assigns the same normalized label to all instances of the data. If the lineage analysis process 430 is unsure as to whether data is the same, then the human verification process 470 may be used to ask a user to confirm or reject a proposed normalized label. If the normalized label is accepted, then the normalized label may automatically be associated with other instances where the data has undergone the same movement operation.

For example, the lineage analysis process 430 can use information about an extract, transform, load (ETL) data movement operation. ETL can be used by a company that has multiple systems, where the company needs to integrate data between the systems (e.g., update customer credit card information between company databases). While ETL is used as an example, one skilled in the art should recognize that information about any number of data movement processes may be used by the lineage analysis process 430 to automatically label structured data. Typically ETL may be done every night, or according to some other predetermined interval, and may include a series of steps wherein data is extracted from outside sources, transformed to fit certain requirements, and loaded into the end target. When this process is set up, the data movement can be tracked and information about it stored in a central registry, such as the storage system 22B of FIG. 1. Since the movement of data from one place to another is tracked, the data in both locations can be assumed to be the same type of data. Accordingly, the same normalized labels can be automatically assigned to both sets of data.

Content Analysis Process

The content analysis process 445 can be used to determine whether certain data, without a normalized label, contains the same type of content as other data, which may have a normalized label. If the content is the same then the normalized label may be assigned to both instances of the data. If it is unclear whether the content is the same, i.e., whether the same label from within the taxonomy should be applied to the data, then the human verification process 470 may be used to determine whether the normalized label should be applied.

The content analysis process 445 may be performed in a number of ways. Embodiments may perform the content analysis process by first scanning columns of data to determine what values are in the column. Next, tables and/or columns may systematically be scanned to determine if the data in the tables and/or columns is similar to the originally scanned columns. For example, if social security numbers are stored according to a certain format (e.g., ###-##-####) then a scan may find tables and/or columns having numerical data stored in a similar format. If the data is similar, then the content analysis process 445 may be used to determine if either column of data is assigned a normalized label.

If a normalized label is already associated with a column, then the normalized label can be assigned to the other column. However, if it is unclear whether the data content is the same, or if neither column has a normalized label, then the human verification process 470 may ask a user what normalized label should be assigned to the data. Alternatively, if neither column has a normalized label then any number of other processes within the classification system 37, such as a lexical name matching process 415, lineage analysis process 430, and/or data access log mining process 460, may be used to suggest and/or assign normalized labels.

Data Access Log Mining Process

The data access log mining process 460 may also be used to automatically label data. The data access log mining process 460 determines what type of data a certain group of users, having a certain role, are accessing by analyzing access logs that are written by databases and/or applications. Most databases and/or applications can be configured to write a log entry each time a user accesses a data item. The entry can contain the identity of the user and the location of the data. This information is joined in a central location, which can then be used for data analysis. The central location may be the storage system 22B of FIG. 1.

The data access log mining process 460 may be configured to operate in many ways depending on the embodiment. For example, embodiments may first configure the databases and/or applications to write logs and join the logs in a central location. Next, for a particular group of users with the same job role, the data access log mining process 460 can be used to analyze the joined logs to determine what data is frequently being accessed. Based on this information, the data access log mining process 460 can assign a normalized label to data, or suggest one or more normalized labels to a user in the human verification process 470.

For example, it may be determined that a group of users work in the payroll department of a company. Based on this information, it can be expected that the group of users should frequently be accessing data related to employee salaries. Therefore, the data access log mining process 460 may analyze the group's activity to find what data the group frequently accesses. Once determined, the data access log mining process 460 may automatically assign a normalized label representing employee salary to the most frequently accessed data. Alternatively, the data access log mining process 460 may present possible normalized labels to a user in the human verification process 470 and ask the user to confirm or suggest a normalized label to be assigned the data.

Human Verification Process

The human verification process 470 can be used in embodiments as a backup to confirm or reject the classification system's 37 classification or labeling of data. The human verification process 470 may also include any number of learning algorithms designed to passively analyze human responses. Based on the user's responses, the learning algorithm may begin to make suggestions to a user based on the past human responses in the human verification process 470. Depending on the learning algorithm, the algorithm may eventually be used to label data without human interaction.

Additional Embodiments

Although the processes in the classification system are described in a certain order, the processes are not limited to that order, nor must all of the process be used. Embodiments may employ any one or more of the processes comprised by the classification system. Additionally, while the examples described above refer to assigning only one normalized label to data, one skilled in the art can recognize that multiple normalized labels within multiple taxonomies can be assigned to data throughout any of the processes within the classification system.

Taxonomy System

Figure 5:
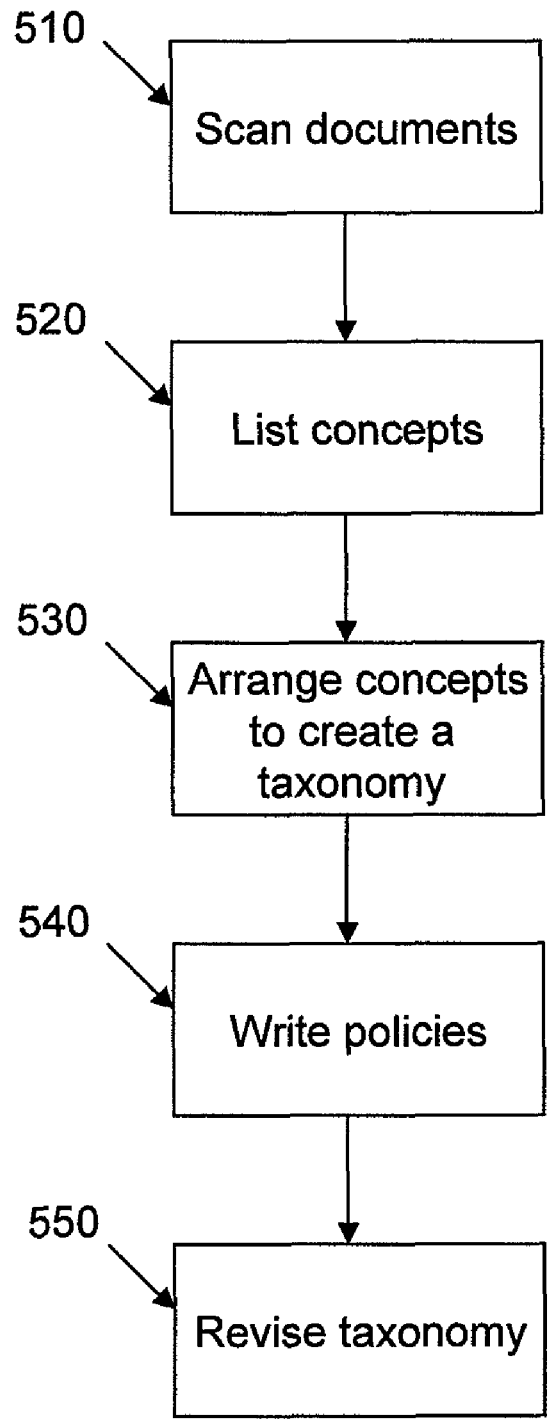
FIG. 5 is a high level flow diagram of steps for creating a taxonomy in accordance with the invention.

FIG. 5 illustrates a high level flow diagram implementing steps of the invention which may be implemented in the environment of FIG. 1. FIG. 5 may equally represent a high-level block diagram of the invention. The steps of FIG. 5 may be implemented and executed from either a server, in a client server relationship, or they may run on a user workstation with operative information conveyed to the user workstation to create a taxonomy. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Taxonomies can be created, for example, by first scanning requirements documents that serve as guidelines for the formulation of formal policies, at step 510. While scanning documents, the domain and scope of the documents may be determined, as well as a determination of what concepts are needed by the policies. Each concept, or combination of concepts, may be represented using one or more normalized labels.

Once the documents are scanned, at step 520, a list of the concepts can be created. This list of concepts may then be arranged to create one or more taxonomies, at step 530. The process, at step 530, may also allow portions of the taxonomies to be revised or extracted as needed to create more comprehensive taxonomies. Additionally, one or more concepts (i.e., labels) may be added to the taxonomy during the creation of the taxonomy, at step 530.

At step 540, one or more policies can be written and assigned to a combination of concepts within the taxonomies. When writing a policy, the policy may contain any number of rules that govern how a data asset is configured, procedures associated with the data asset, and/or security practices that should be used when dealing with the data asset. These policies can be specifically written for any portion of the taxonomies, or alternatively, pre-existing policies within an industry or company may be used instead of creating new policies. Any portion of the taxonomies may be further added, deleted, or revised at step 550 to better represent the concepts needed by the policy. Additionally, embodiments may employ validation techniques to ensure data assets are properly represented within a taxonomy.

While the invention has been described in terms of embodiments, those skilled in the art will recognize that the invention can be practiced with modifications and in the spirit and scope of the appended claims.

What is claimed is:

1. A system comprising:
   a CPU, a computer readable memory and a computer readable storage media;
   a taxonomy component configured to provide one or more normalized labels; and
   a classification tool configured to automatically classify data across an enterprise system using the one or more normalized labels, the classification tool comprising:
   a lexical name matching component that analyzes data without a normalized label, determines a name that is assigned to the data, and compares the name assigned to the data to the one or more normalized labels, wherein if the name appears in the one or more normalized labels, then the one or more normalized labels with the name is added to a list of suggested normalized labels for the data;
   a lineage analysis component that analyzes data movement operations to determine if data in one or more locations is the same, wherein if the data is the same, only in different locations, then the lineage analysis component assigns a same normalized label to all instances of the data without a normalized label;
   a content analysis component that analyzes whether data without a normalized label contains a same type of content as other data with a normalized label, wherein if the content is the same then the normalized label is assigned to the data originally without the normalized label; and
   a data access log mining component that analyzes access logs to determine data that a certain group of users is accessing, wherein the data access log mining component assigns a same normalized label to instances of the data that the certain group of users is determined to be accessing,
   wherein the CPU is configured to provide the one or more normalized labels and to classify the data via the taxonomy component and the classification tool.

2. The system of claim 1, wherein the lexical name matching component analyzes a list of synonyms related to the one or more normalized labels.

3. The system of claim 1, wherein the data movement operations are extract, transform, and load (ETL) operations.

4. The system of claim 1, wherein one or more policies are assigned to the one or more normalized labels.

5. The system of claim 4, wherein the one or more policies are comprised of one or more rules, which are configured to be applied to the one or more normalized labels.

6. The system of claim 1, further comprising a verification tool, which allows a user to verify the classification tool's classification.

7. The system of claim 1, wherein the classification tool suggests the one or more normalized labels to a user before automatically classifying the data.

8. The system of claim 1, wherein the classification tool further comprises a verification component that is utilized as a backup to confirm or reject the assignment of the one or more normalized labels to the data by the lineage analysis component, the content analysis component and the data access log mining component, the confirmation or the rejection being a response supplied by a user of the system.

9. The system of claim 8, wherein the verification component comprises a learning algorithm configured to passively analyze the user responses, and based on previous user responses to the human verification component, the learning algorithm will automatically assign the one or more normalized labels to the data without the user confirmation or rejection.

10. The system of claim 9, wherein one or more policies are assigned to the one or more normalized labels, and the one or more policies are comprised of one or more rules, which are configured to be applied to the one or more normalized labels.

11. The system of claim 10, wherein if the name assigned to the data does not appear in the one or more normalized labels, then the lexical name matching component compares the name to a list of synonyms generated for each of the one or more normalized labels, and if the name appears in the list of synonyms, then the one or more normalized labels corresponding with the list of synonyms is added to the list of suggested labels for the data.

12. The system of claim 11, wherein the taxonomy component assigns the one or more normalized labels to the data which are assets of the enterprise system, and the one or more normalized labels are business terms that are organized in a controlled vocabulary and are organized into one or more hierarchies.

13. A method for classifying data, comprising:
extracting metadata from one or more relational databases;
suggesting classifications based on the metadata; and
converting one or more names to normalized labels across an enterprise system based on the suggested classifications,
wherein the converting of the one or more names to the normalized labels comprises:
analyzing data without a normalized label using lexical name matching by determining a name that is assigned to the data and comparing the name assigned to the data to the one or more normalized labels, wherein if the name appears in the one or more normalized labels, then the one or more normalized labels with the name is added to a list of suggested normalized labels for the data;
analyzing data movement operations of data associated with the one or more names to determine if data in one or more locations is the same, wherein if the data is the same, only in different locations, then converting the one or more names associated with the same data to normalized labels based on the suggested classifications;
analyzing whether data associated with one or more names without a normalized label contain a same type of content as other data associated with one or more names with a normalized label, wherein if the content is the same then converting the one or more names associated with the same data to normalized labels based on the suggested classifications; and
analyzing access logs to determine data that a certain group of users is accessing, wherein one or more names associated with the data that the certain group of users is determined to be accessing is converted to normalized labels based on the suggested classifications.

14. The method for classifying data of claim 13, wherein the one or more normalized labels are automatically suggested, and the converting of the one or more names further comprises analyzing the one or more names using lexical name matching.

15. The method for classifying data of claim 13, wherein the classifications are normalized labels within a taxonomy.

16. The method for classifying data of claim 13, further comprising confirming the classification is accurate via a verification process.

17. The method for classifying data of claim 13, further comprising assigning a policy to the classification, which applies to all instances of the classification.

18. A computer program product comprising a computer usable memory having readable program code embodied in the memory, the computer program product includes at least one component configured to:
define one or more normalized labels; and
associate the one or more normalized labels to data across an enterprise system,
wherein the association of the one or more normalized labels to the data comprises:
a lexical name matching process comprising:
analyzing metadata for each respective said data to determine a name associated with each respective said data;
comparing the name to the one or more normalized labels;
when the name matches the one or more normalized labels, adding the matched one or more normalized labels to a list of suggested one or more normalized labels;
when the name does not match the one or more normalized labels, comparing the name to a list of synonyms for the one or more normalized labels; and
when the name matches a synonym for the one or more normalized labels, adding the corresponding one or more normalized labels to the list of suggested one or more normalized labels;
analyzing data movement operations of the data to determine if data in one or more locations is the same, wherein if the data is the same, only in different locations, then associating a same normalized label to all instances of the data;
analyzing whether data without a normalized label contains a same type of content as other data with a normalized label, wherein if the content is the same then the normalized label is associated to the data originally without the normalized label; and
analyzing access logs to determine data that a certain group of users is accessing, and associating a same normalized label to instances of the data that the certain group of users is determined to be accessing.

19. The computer program product of claim 18, wherein the one or more normalized labels are automatically associated to the data.

20. The computer program product of claim 18, further comprising a verification component structured to accept or reject the association of the one or more normalized labels to the data.

21. The computer program product of claim 18, wherein:
the data is data assets;
the one or more normalized labels are business terms organized in a controlled vocabulary and organized into one or more hierarchies, wherein the one or more hierarchies of the business terms is a taxonomy that reflects one dimension that is relevant to a business;
the at least one component is further configured to:
extract the metadata for the data assets of the business without the one or more normalized labels, wherein the metadata includes a relational schema that defines each respective said data asset;
store and organize the extracted metadata according to the relational schema; and
associate the one or more normalized labels to the data assets by performing algorithmically-controlled mappings of the relational schema and labeling each respective said data asset with the one or more normalized labels; and
the association of the one or more normalized labels to the data comprises algorithmically-controlled mappings of the one or more normalized labels to the data assets comprising:
the lexical name matching process;
a lineage analysis process comprising:
the analyzing data movement operations of the data;
a content analysis process comprising:
the analyzing whether the data without the normalized label contains the same type of content as the other data with the normalized label; and
a data access mining process comprising:
the analyzing the access logs to determine the data that the certain group of users is accessing.

22. A method for classifying data, comprising:
providing a computer infrastructure being configured to:
classify data across an enterprise system by assigning one or more normalized labels to the data,
wherein the assignment of the one or more normalized labels to the data comprises:
analyzing data without a normalized label using lexical name matching by determining a name that is assigned to the data and comparing the name assigned to the data to the one or more normalized labels, wherein if the name appears in the one or more normalized labels, then the one or more normalized labels with the name is added to a list of suggested normalized labels for the data;
analyzing data movement operations of the data to determine if data in one or more locations is the same, wherein if the data is the same, only in different locations, then assigning a same normalized label to all instances of the data;
analyzing whether data without a normalized label contains a same type of content as other data with a normalized label, wherein if the content is the same then the normalized label is assigned to the data originally without the normalized label; and
analyzing access logs to determine data that a certain group of users is accessing, and assigning a same normalized label to instances of the data that the certain group of users is determined to be accessing.

* * * * *